May 27, 1958 SEIICHI MAMIYA 2,836,109
FILM WINDING AND SHUTTER SETTING MECHANISM FOR A CAMERA
Filed May 12, 1955 2 Sheets-Sheet 1

2,836,109

FILM WINDING AND SHUTTER SETTING MECHANISM FOR A CAMERA

Seiichi Mamiya, Bunkyo-ku, Tokyo-to, Japan

Application May 12, 1955, Serial No. 507,947
In Japan April 16, 1949

Public Law 619, August 23, 1954
Patent expires April 16, 1969

4 Claims. (Cl. 95—31)

This invention relates to cameras, more particularly to a shutter mechanism of a camera.

It is an object of this invention to obtain a shutter mechanism which is remarkably simple in construction and operation and suitable for small cameras.

A feature of the shutter mechanism in accordance with the invention is that it is able to perform film winding, shutter setting and stopping of the film winding in one operation.

Other objects, features and advantages of the invention will be understood from the following description and claims in conjunction with the accompanying drawing, wherein:

Figure 1:
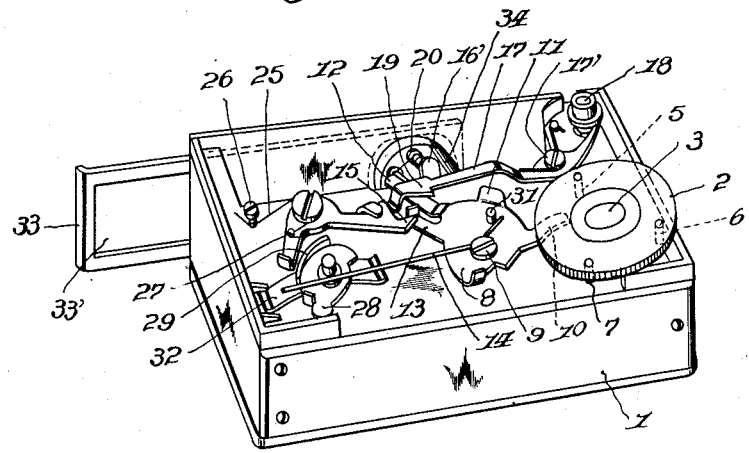
Fig. 1 is a perspective view of a small camera provided with a shutter mechanism in accordance with the invention, in which the case cover is removed with the shutter operating plate in a position corresponding to the position after taking a picture.

Referring to the drawings particularly on Fig. 1 in which is shown the upper surface of a camera case 1 having a rotatable film winding disk 2 attached thereto. A film winding shaft 3 is fixed vertically to the center part of said disk and is engaged with shaft 4' of a film spool 4 enclosed in the camera case 1.

Three engaging pins 5, 6 and 7 projecting downwardly are fixed to the film winding disk 2 at equidistance points along a circle. A shutter operating plate 8 is pivotally mounted on the upper surface of the camera case 1 by a pivot 9 and having a lug piece or arm 10 for setting said plate 8, a stopping piece or projection 11 for stopping said plate 8, a shutter operating arm 12 and a stop or arm 13 having an end 13' bent upwardly. A spring 14 is wound around pivot 9 having one end thereof engaging a pin 31 fixed to plate 8 and the other end engaging a projection 29 of an adjuster 28 so as to urge the plate 8 in a counterclockwise direction. The adjuster member 28 is pivotally mounted on the upper plate (not shown) of the camera case 1 by means of a pivot 30. A resilient member 32 fixed at one end to the camera case upper plate and at the other end to the side plate or cover urges the adjuster 28 into engagement with the cover so as to bind it.

The adjuster 28 is connected to a knob (not shown) external of the case 1 by means of which the adjuster member may be rotated by the camera operator. In this manner the spring force of the spring 14 is readily adjusted and maintained since the adjuster 28 is held in a set position by the resilient member 32 and not permitted to rotate in reverse direction.

Accordingly the speed by which shutter operating plate 8 operates shutter 16 is determined by adjuster 28 controlling the tension or spring force of spring 14.

A lens cylinder 34 is mounted on the forward face of the camera case 1. The lens cylinder is provided with a shutter disc 16 having a projection 16' to which is attached a fixed pin 20. The projection 16' is adapted to be depressed by the arm 12 of the shutter operating plate 8 so as to open the shutter in a manner later discussed herein. A spring 21 wound around the pin 20 having one end fixed to the shutter disc 16 and the other end engaging a fixed pin 22 so as to urge the shutter disc clockwise to the shutting position thereof.

A window-like frame 33 is slidably arranged at the front face or surface of the camera case so as to be slidable to the position shown in Fig. 1. The window or opening 33' formed when the frame is in this position is used as a view finder.

Figure 3:
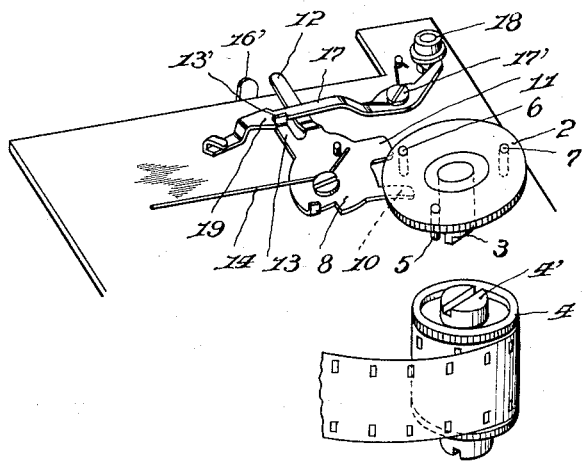
Fig. 3 is a perspective view of part of the mechanism shown in Fig. 1, showing the film spool thereof separated from the film winding disk and the shutter operating plate in a position corresponding to the ready position of said plate.

A hooking lever 17 having a hook 19 is pivotally mounted at a pivot 17' so as to be urged clockwise against the force of a spring 35 when a shutter button 18 is depressed. The spring 35 is wound around pivot 17' and has one end hooked in fixed position with said lever 17 and the other end fixed to a stationary pin 36. The position of the hooking lever 17 is selected so that when the shutter button 18 is released the hook portion 19 can be engaged with the upwardly projecting end 13' of the arm 13 as shown in Fig. 3 to stop the shutter operating plate 8 at a ready position. A stopping piece or member 23 pivotally mounted at a pivot 24 and urged counterclockwise by a spring 25 is used to stop the hooking lever 17 after a picture has been taken in a manner later described, one end of spring 25 being engaged with a stationary pin 26 and the other end with a pin 27 fixed on piece 23.

The operation of the camera is as follows: When a picture has been taken the mechanism is in the position shown in Fig. 1. The camera operator rotates the film winding disc 2 in a counterclockwise direction so as to rotate spool 4 and ready the film for another exposure. When disc 2 is rotated one of the pins 5, 6 and 7, as for example 5, engages the finger 10 of the shutter operating plate 8 whereby plate 8 is rotated in a clockwise direction against the force of the spring 14. The shutter operating plate is rotated by pin 5 into a ready position whereupon the pin 5 clears the end of finger 10 meanwhile pin 6 has moved up into engagement with projection 11 (Fig. 3) and the winding operation is stopped.

Figure 2:
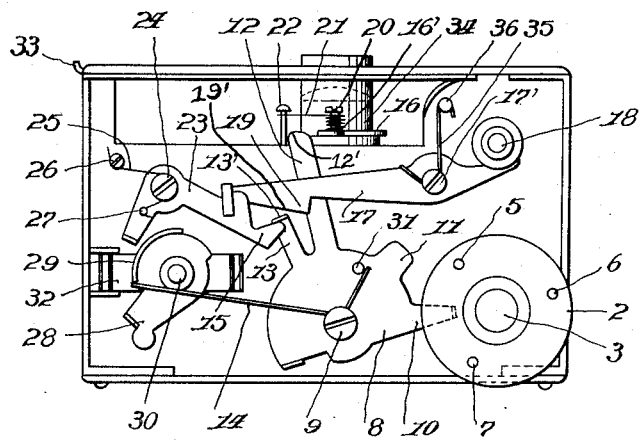
Fig. 2 is a plan view of the mechanism in Fig. 1.

While rotating the shutter operating plate carries arm 13 against the beveled portion 19' of hook 19 and the lever 17 is moved in a clockwise direction against the force of the spring 35. Once the beveled portion has been cleared the lever 17 is urged in a counterclockwise direction and the bent end 13' or arm 13 abuts against the hook 19 and the shutter operating plate 8 is locked in a ready position. The arm 12 is so designed that the free end 12' is arcuate (Fig. 2) and acts as a cam, when the plate 8 is rotated into a ready position, engaging the projection 16' and deflecting it slightly toward the face of the case 1 without depressing it. The arm 12 thus moves from a position of rest immediately after a picture has been taken (Fig. 1) to a position of readiness for a taking of a picture (Fig. 3). The arcuate end 12' of arm 12 is so designed that upon a return movement the projection 16' is engaged and depressed so as to open the shutter in the manner later herein described.

When the camera has thus been readied the operator depresses push-button 18 the lever 17 is rotated in a clockwise direction and the hook portion 19 of the lever 17 releases arm 13 so that the spring 14 immediately moves the shutter operating plate 8 in a counterclockwise direction and the arm 12 engages the projection 16' depressing it so as to momentarily open the shutter 16 to effect an exposure. The arm 13 is rotated so that its bent portion 13' engages the hook portion 15 of lever 23 and the plate 8 is held from further counterclockwise rotation and in readiness for winding the film and positioning the shutter mechanism for another exposure.

According to the invention, as seen from the above description, film winding, shutter setting and stopping of film winding can be performed during winding of the film by means of only one operation, namely the simple rotation of the film winding disk. Thus it is readily apparent the construction of the device in accordance with the invention is very simple and suitable for any small camera.

Since it is obvious that many changes and modifications can be made in the above-described details without departing from the nature and spirit of this invention, it is not limited to the above examples and illustrations.

I claim:

1. In a camera provided with a case, a film-feeding spool, an objective, a shutter, resilient means biasing the shutter in a closed position, said shutter having a projection adapted to be actuated so as to open the shutter, an improved shutter mechanism comprising in combination a rotatable shutter operating plate, means for feeding film from said film-feeding spool to the focal plane of the objective and for simultaneously rotating the shutter operating plate into a ready position for operating and opening the shutter, means biasing the shutter operating plate in a direction away from said ready position and in a shutter operating direction, a hooking lever cooperating with said plate adapted to engage and hold said plate in a ready position, means biasing said hooking lever into engagement with said plate so as to hold it in a ready position, a push-button to release said hooking lever so as to release said shutter operating plate from said ready position, said plate being provided with a plurality of projections including a setting-arm adapted to cooperate with said means for feeding the film and rotating the plate so as to rotate the plate, a first stop-arm adapted to cooperate with said means for feeding the film and rotating the plate so as to stop said last mentioned means and determine the length of film being fed, a second stop-arm cooperating with said hooking lever so as to hold said plate in a ready position, a shutter-operating-arm adapted to engage said shutter projection so as to open the shutter when said push-button releases the plate and said biasing means move the plate away from said ready position to operate the shutter, said means for feeding the film and simultaneously rotating the shutter operating plate comprising a rotatable-film-feeding disc engaging said film spool, said disc being provided with a plurality of fixed pins positioned on said disc at points equal distance one from the other, said pins being adapted to engage said plate, whereby when said film feeding disc is rotated to feed the film for an exposure a first pin carried by the disc engages said setting-arm of said plate and said plate is rotated in a direction for setting it in a position for operating the shutter to take an exposure, and when said plate is in a ready position said hooking lever immediately hooks said second stop-arm of the plate to hold the plate in ready position and continued rotation of said disc disengages said first pin from said setting-arm and a second pin carried by said disc engages and abuts against said first stop-arm of the plate to stop rotation of the film feeding disc.

2. In a camera in accordance with claim 1, in which plurality of pins carried by said film-feeding disc comprises three pins positioned equal distance, one from the other, and on the same diameter on said disc, whereby any two pins cooperate and sequentially rotate the shutter-operating-plate and stop the rotation of the film-feeding disc.

3. In a camera in accordance with claim 1, in which said shutter operating arm of said shutter operating plate is normally positioned on one side of the shutter projection and is transferred to the other side of said projection in the course of rotating said plate to the ready position, said shutter operating arm having an arcuate free end, said free end being adapted to deflect laterally said shutter projection without operating the shutter as the shutter operating plate is moved into a ready position and adapted to depress the shutter projection so as to open the shutter when the push-button release is actuated.

4. In a camera in accordance with claim 1, further including a shutter speed adjuster comprising a manually rotatable adjuster lever pivotally mounted on a side of the camera case and having an arcuate projection substantially normal to the lever, a spring fixed to and cooperating with said shutter operating plate, said projection and adjuster engaging said spring, whereby when the adjuster lever is rotated so that the arcuate projection engages said spring the speed of the shutter is increased and a resilient member fixed to said case and positioned so as to move a pivotal portion of said adjuster against the case, whereby frictional drag between the adjuster and the case binds the adjuster and reverse rotation is precluded.

References Cited in the file of this patent

UNITED STATES PATENTS 1,091,814     Dietz _____ Mar. 31, 1914

FOREIGN PATENTS 573,910     Great Britain _____ Dec. 12, 1945